United States Patent [19]

Makishima

[11] Patent Number: 4,473,142
[45] Date of Patent: Sep. 25, 1984

[54] PARKING SYSTEM FOR A VEHICLE

[75] Inventor: Sadao Makishima, Akikawa, Japan

[73] Assignee: Fuji Jukogyo Kabushiki Kaisha, Tokyo, Japan

[21] Appl. No.: 347,211

[22] Filed: Feb. 4, 1982

[30] Foreign Application Priority Data

Feb. 6, 1981 [JP] Japan ................................. 56-17335

[51] Int. Cl.³ .......................... B60K 41/26; B60T 1/06
[52] U.S. Cl. .................................. 192/4 A; 74/473 R
[58] Field of Search ............. 192/4 A, 4 C; 74/473 R, 74/477

[56]  References Cited

U.S. PATENT DOCUMENTS

| | | | |
|---|---|---|---|
| 2,694,943 | 11/1954 | Brumbaugh | 74/473 R |
| 3,213,968 | 10/1965 | Platz | 188/69 |
| 3,987,879 | 10/1976 | Longshore et al. | 192/4 A |
| 4,151,902 | 5/1979 | Hiraiwa et al. | 192/4 A |
| 4,277,983 | 7/1981 | Izumi et al. | 74/477 |
| 4,310,081 | 1/1982 | Kolacy | 192/4 A |

*Primary Examiner*—Allan D. Herrmann
*Attorney, Agent, or Firm*—Martin A. Farber

[57]  ABSTRACT

A parking system for a vehicle having a fluid operated clutch or electromagnetic clutch. A shifter arm is rotatably and axially slidably mounted on a shaft and a link mechanism is provided for transmitting the operation of the gear shaft lever to the shifter arm for rotating and sliding it. In a transmission of the vehicle, a parking shifter rail provided for parking operation is connected to the shifter arm by a fork. A parking pawl operatively engages the parking shifter rail, and a parking gear in the transmission engages the parking pawl. When the gear shift lever is shifted to the parking position, the parking pawl is rotated by the movement of the parking shifter rail and engaged with the parking gear. Thus, the transmission system of the vehicle is locked by the parking pawl.

4 Claims, 9 Drawing Figures

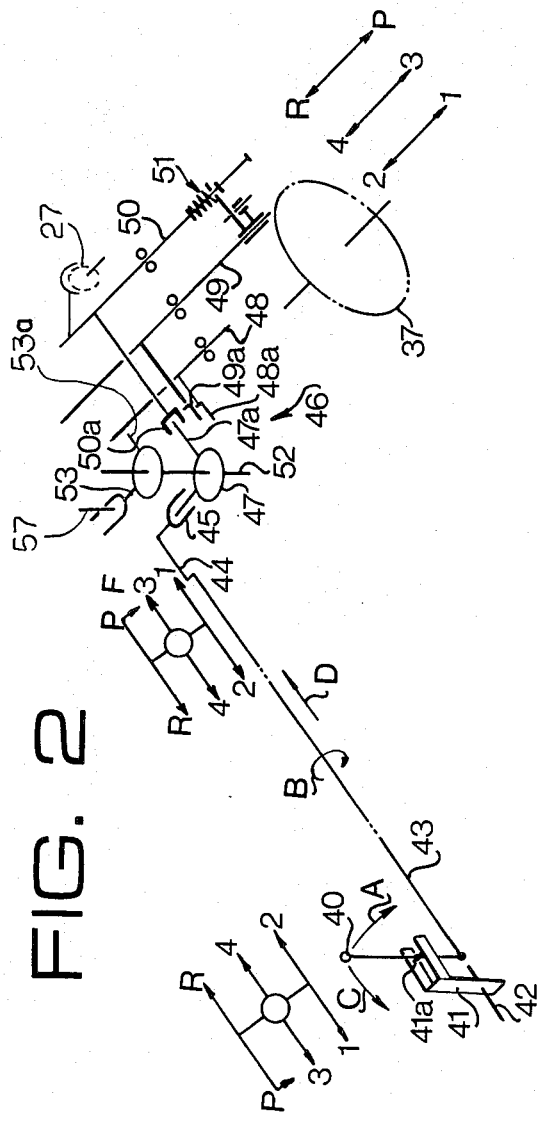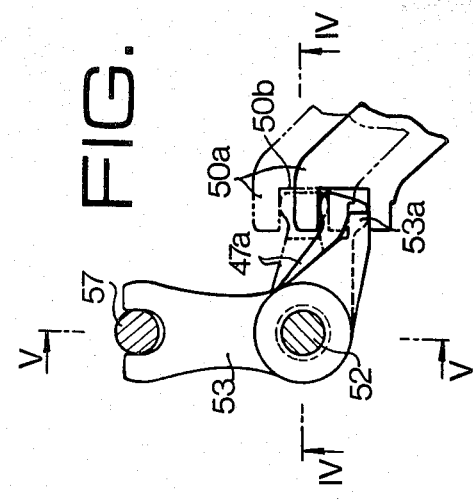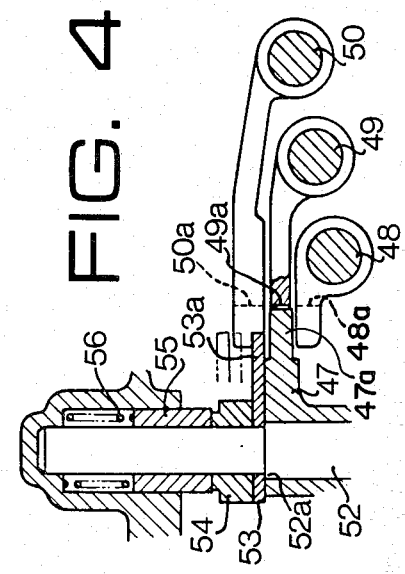

PARKING SYSTEM FOR A VEHICLE

BACKGROUND OF THE INVENTION

The present invention relates to a parking system for a vehicle provided with a clutch such as a fluid clutch or an electromagnetic power clutch, which is disengaged while the engine of the vehicle is off.

In such a vehicle provided with the above described clutch, even if any one of gears in the transmission is engaged with another gear, there is no parking brake effect because of disengagement of the clutch. Therefore, generally, a system for mechanically locking the transmission system in a parking position of a shift lever is provided in such a vehicle. Such a system is disclosed in Japanese laid open patent application No. 52-121225. The disclosed system is provided with a mechanism for supporting a lock mechanism on a transmission case or housing. Consequently, the construction becomes complicated.

SUMMARY OF THE INVENTION

The object of the present invention is to provide a parking system which eliminates the above described disadvantages.

According to the present invention, there is provided a parking system for a vehicle having a clutch, a transmission, a gear shift layer, a link mechanism for transmitting the operation of the gear shift lever to shifter rails in the transmission for selectively change speed gears, and a parking position for the gear shift lever, the improvement comprising, a shifter arm rotatably and axially slidably mounted on a shaft, means for transmitting the operation of the gear shift lever to the shifter arm for rotating and sliding thereof, a parking shifter rail provided for parking, fork means for connecting the shifter arm with the parking shifter rail, a parking pawl operatively engaged with the parking shifter rail, a parking gear provided in the transmission so as to be engaged with the parking pawl, and means for converting the movement of the parking shifter rail to the movement of the parking pawl for engaging the pawl with the parking gear. A lock lever only slidable on said shaft and a spring for urging said lock lever to said shifter arm, whereby said lock lever can be engaged with said fork means together with said shifter arm in a parting position.

The present invention will be more apparent from the following description made with reference to the accompanying drawings.

BRIEF DESCRIPTION OF THE DRAWINGS

FIG. 2 is a schematic illustration showing an embodiment of the present invention;

FIG. 3 is a plan view showing a portion of a shifter arm;

FIG. 4 is a sectional view taken along the line IV—IV of FIG. 3;

DETAILED DESCRIPTION OF THE PREFERRED EMBODIMENTS

Figure 1:
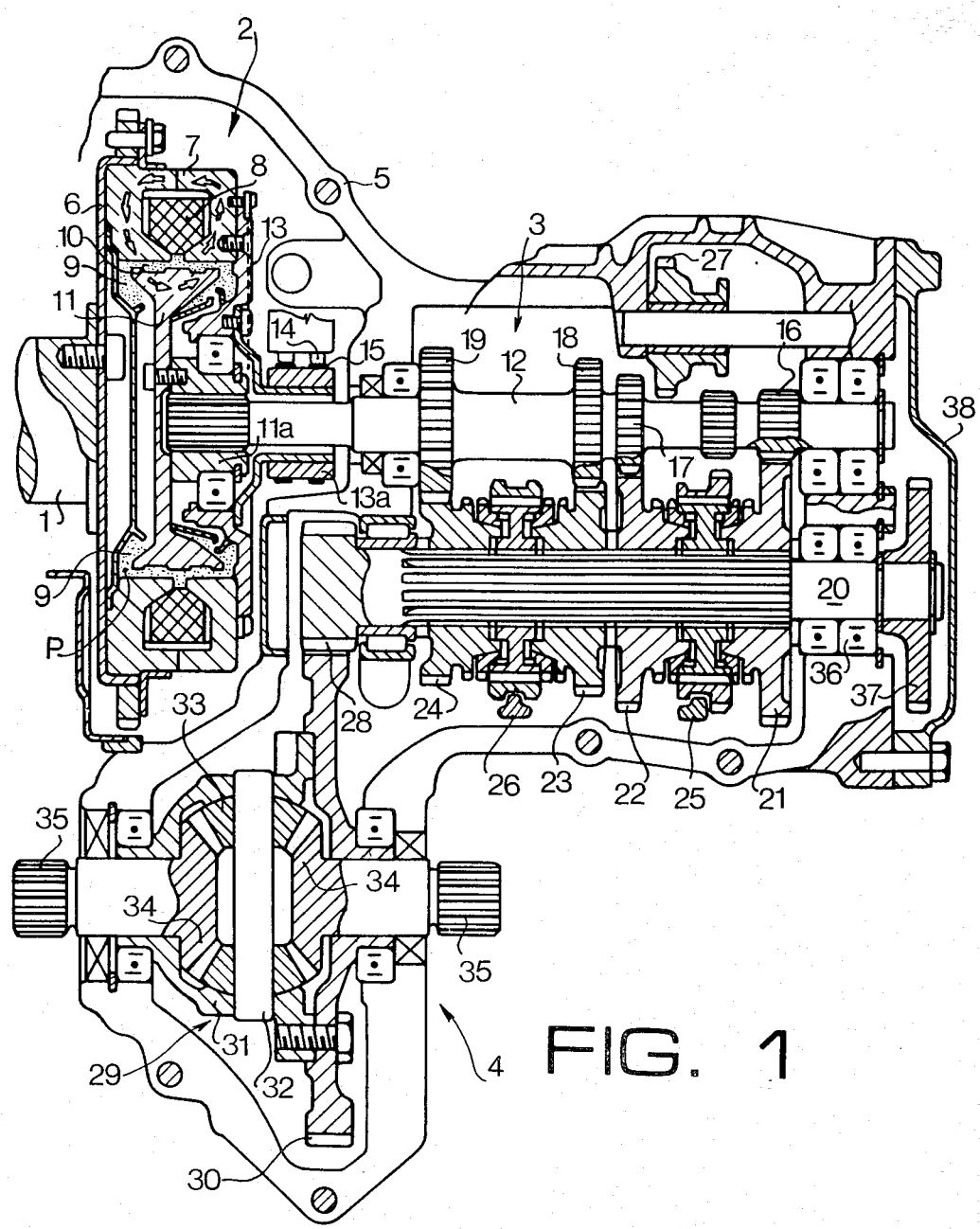
FIG. 1 is a cross-sectional view of an electromagnetic powder clutch used in a system of the present invention.
Figure 5:
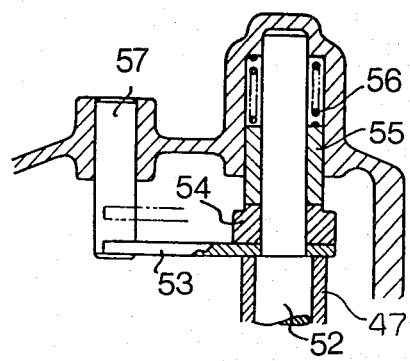
FIG. 5 is a sectional view taken along the line V—V of FIG. 3.

In FIG. 1, a transmission of the present invention comprises a crankshaft 1 of an internal combustion engine transversely mounted on a vehicle (not shown), an electromagnetic powder clutch 2, a four-speed transmission 3 and a final reduction device 4.

The electromagnetic powder clutch 2 located in a clutch case 5 comprises a drive plate 6 secured with the end of a crankshaft 1 of the internal combustion engine, an annular drive member 7 secured to the drive plate 6, a magnetizing coil 8 provided in the drive member 7, and a driven member 11. A boss 11a of the driven member 11 is secured by a spline engagement with an input shaft 12 of the transmission 2. The periphery of the driven member 11 is spaced from the drive member 8 by a gap 10. Magnetic powder P is provided in a powder chamber 9 so that the gap 10 can be filled with the powder. A cap 13 is secured to the drive member 7. The cap 13 has a boss 13a coaxial with the input shaft 12, on which slip rings 15 are securely provided. The slip rings 15 are connected to the coil 8 by leads. Brushes 14 are pressed against the slip rings 15.

In such a construction, the drive plate 6 and the drive member 7 rotate together with the crankshaft 1 and the magnetic powder which is sealed in the powder chamber 9 is driven onto the inner surface of the drive member 7 by centrifugal force. When a gear shift lever (not shown in FIG. 1) is shifted to engage gears, current is supplied to the coil 8 through the leads, the brushes 14, and the slip rings 15, so that the drive member 7 is magnetized to produce a magnetic flux passing through the driven member 11 as shown by arrows in FIG. 1. Thus, the magnetic flux causes the powder to cohere in the gap 10, so that the output of the crankshaft is transmitted to the input shaft 12 through the clutch. A clutch control system is so arranged that the current increases with an increase of the engine speed.

In the transmission 3, 1st to 4th speed drive gears 16 to 19 are integrally mounted on the input shaft 12. The drive gears 16 to 19 are selectively engaged with driven gears 21 to 24, respectively the driven gears 21 to 24 are rotatably mounted on the output shaft 20 parallel to the input shaft 12. Each of the driven gears 21 and 22 is adapted to be engaged with the output shaft 20 by operating a synchromesh mechanism 25, and each of the driven gears 23 and 24 is selectively engaged with the output shaft 20 by a synchromesh mechanism 26 in the well known manner. Further, a reverse driven gear 27 is operatively mounted in the clutch case. Thus, by operating the gear shift lever of the transmission, the driven gear 21 is coupled to the output shaft 20 by the synchromesh mechanism 25 and the 1st speed is obtained on the output shaft 22; the 2nd, 3rd and 4th speeds, and reverse gear operation are similarly obtained.

Further, provided on an end of the output shaft 20 is an output gear 28 which engages with a ring gear 30 of a differential 29 of the final reduction device 4. The output of the output shaft 20 of the transmission 3 is transmitted from a ring gear 30 to gears 34 through a case 31, a spider 32 and pinions 33, and then to driving wheels through wheel shafts 35.

In accordance with the present invention, a parking gear 37 is secured to the opposite end of the output shaft 20 at the outside of a bearing 36, and is covered by a cover 38.

Referring to FIG. 2, a gear shift lever 40 is rotatably supported on a swing arm 41 by a pin 41a and the lower end of the gear shift lever 40 is pivotally connected to one end of a rod 43. The swing arm 41 is rotatably supported on a shaft 42 which is coaxial with the rod 43. The rod 43 is supported in such a manner that it may be shifted in the axial direction and rotated about its own axis. When the gear shift lever 40 is urged in the direction of arrow A for the purpose of the selection of the 1st or 2nd speed in the illustrated shift pattern, the gear shift lever swings in the direction of the arrow A about the shaft 42 together with the swing arm 41. Thus, the rod 43 rotates in the direction of the arrow B. When the lever 40 is shifted in the direction C to select the 1st speed, the lever swings about the pin 41a. Thus, the rod 43 slides in the direction D. When the 3rd or 4th speed position is merely selected, the rod 43 is not rotated by this operation. When the lever 40 is shifted to the reverse gear R or parking position P, the rod 43 rotates in a direction opposite to the 1st and 2nd positions.

The other end of the rod 43 is connected to a fork 45 through a shaft 44. The fork 45 operatively engages one of the arms of a shifter arm 47 for a shifter rail selecting device 46. The shifter arm 47 is slidably and rotatably mounted on a vertical shaft 52. The other arm 47a of the shifter arm 47 is adapted to selectively engage with one of forks 48a, 49a and 50a. As shown in FIGS. 2 and 4, the forks 48a to 50a are secured to shifter rails 48, 49 and 50, respectively, and these forks are vertically arranged selectively and operatively engaged with the arm 47a. The shifter rail 48 for the 1st and 2nd speed is connected to the synchromesh mechanism 25 with a fork (not shown), a shifter rail 49 for the 3rd and the 4th speed is connected to the synchromesh mechanism 26, and a shifter rail 50 is connected to the reverse gear 27. A lock lever 53 is slidably mounted on a small diameter portion of the shaft 52 and downwardly biased by a spring 56 through a spacer 54 and an accent sleeve 55 to rest on a shoulder 52a. The lock lever 53 comprises a 1st arm engaged with a stop pin 57 to prevent the rotation of the lever, and a 2nd arm having a stopper end 53a selectively engaged with an identification 50b of the fork 50a at the parking position of the gear shift lever 40.

Figure 7:
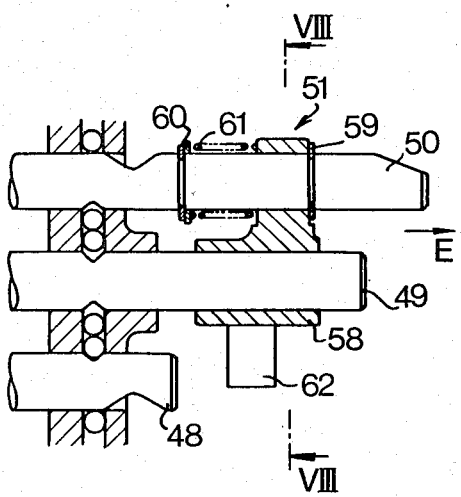
FIG. 7 is a plan view of a portion of a parking cam.
Figure 8:
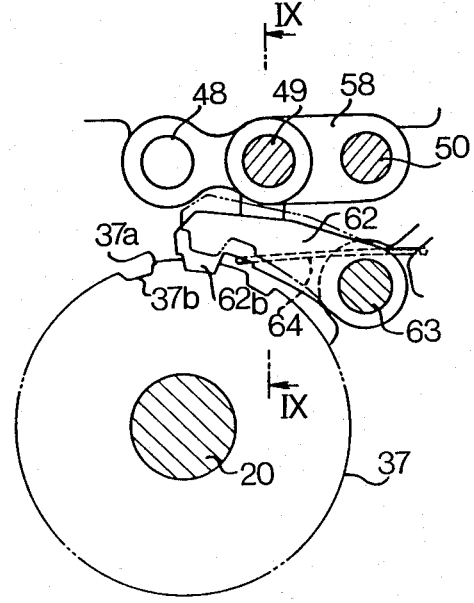
FIG. 8 is a sectional view taken along the line VIII—VIII of FIG. 7.
Figure 9:
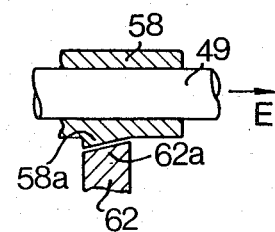
FIG. 9 is a sectional view taken along the line IX—IX of FIG. 8.

Referring to FIGS. 7 to 9, a lock mechanism 51 is provided adjacent to the parking gear 37. The lock mechanism 51 comprises a cam 58 slidably mounted on the shifter rails 49 and 50. The cam 58 is disposed between snap rings 59 and 60 which are engaged on the shifter rail 50 and is biased by a spring 61 against the snap ring 59. A parking pawl 62 is rotatably mounted on a shaft 63 and disposed between the cam 58 and parking gear 37. A spring 64 is provided for urging a bevel 62a of the parking pawl 62 against a bevel 58a of the cam 58. The parking pawl 62 has a stopper end 62b engaged with one of the recesses 37b between the teeth 37a of the gear 37.

In operation, when the gear shift lever 40 is shifted in the direction A (FIG. 2), the shaft 52 is lowered by the fork 45, so that the arm 47a engages with the lowermost fork 48a. Thus, by shifting the lever 40 in the direction C or in the opposite direction, the arm 47a is rotated about the shaft 52 and then the shifter rail 48 is axially moved. Accordingly, the 1st speed or 2nd speed is selected. Similarly, the 3rd speed and 4th speed are selected by shifting the lever 40.

Figure 6:
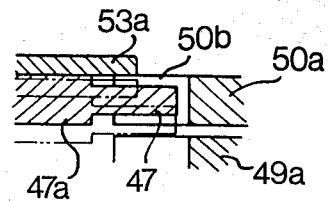
FIG. 6 is a sectional view showing a part of the shifter arm in a parking position.

In the parking state, when the gear shift lever 40 is shifted in the inverted direction of the direction A, the arm 47 is elevated, so that the arm 47a engages with the fork 50a as shown in FIG. 3 by dotted lines. Further, the lever 40 is shifted to the parking position, the shifter rail 50 is moved in the direction E (FIGS. 7 and 9). The movement of the shifter rail 50 causes the cam 58 to move in the direction E with the rail 50, the parking pawl 62 to rotate in the counter-clockwise direction by the effect of the bevel 58a and the bevel 62a in FIGS. 8 and 9. Thus, the stopper end 63b engages with the recess of the gear 37. If the stopper end 62b abuts the top of a tooth 37a, the spring 61 is compressed by the obstacle of presented by the tooth and the gear 37 is not locked. However, if the vehicle moves slightly forward or rearward, the gear 37 is rotated which will result in the engagement of the stopper end 62b with the recess of the gear 37. Thus, the transmission system of the vehicle is locked by the parking pawl 62. The parking position of the fork 50a and the arm 47a is shown in FIG. 3 by solid lines. In such a state, if the gear shift lever 40 is freed from the operator's hand or intentionally shifted in the direction F (FIG. 2), the shaft 52 and the lock lever 53 are lowered by the spring 56. Thus, the stopper end 53a engages with the identification 50b of the fork 50a. In this position, both the arm 47a and the stopper end 53 are engaged with the fork 50a as shown by dotted line in FIG. 6. Thus, the parking conditions are securely maintained by the lock lever 53.

In order to release the parking lock condition, the lever 40 is shifted in the reverse order to the parking operation. First, the lever 40 is shifted in the reverse direction of the direction F to remove the lock lever 53 from the fork 50a, and then, the lever 40 is shifted to the neutral position. Accordingly, the shifter rail 50 is returned to the neutral position and the parking pawl 62 is removed from the gear 37 by the string 64. Thus, the parking lock is released.

In accordance with the present invention, the parking lock mechanism is simplified in construction using the shifter rail selecting devices for selecting the change gears.

While the presently preferred embodiment of the present invention has been shown and described, it is to be understood that this disclosure is for the purpose of illustration and that various changes and modifications may be made without departing from the spirit and scope of the invention as set forth in the appended claim. What is claimed is:

1. In a parking system for a vehicle having a transmission, a clutch for operatively connecting a crankshaft of an engine of the vehicle to the transmission, a gear shift lever, shifter rails for selecting change speed gears in said transmission, a parking shifter rail, a link mechanism for transmitting the operation of said gear shift lever to said shifter rails and for shifting one of the shifter rails, the improvement wherein
said link mechanism comprises a shifter arm rotatably and axially slidably mounted on a shaft,
means for transmitting the operation of said gear shift lever to said shifter arm for rotation and sliding thereof,
fork means for connecting said shifter arm with said parking shifter rail,
a parking pawl operatively engaged with said parking shifter rail,
a parking gear provided in said transmission engageable with said parking pawl, means for converting the movement of said parking shifter rail to movement of said parking pawl for engaging said pawl with said parking gear, and a lock lever only slidable on said shaft and a spring for urging said lock lever to said shifter arm, whereby said lock lever can be engaged with said fork means together with said shifter arm in a parking position.

2. The parking system for a vehicle having a transmission in accordance with claim 1, wherein said parking shifter rail is integrated with the shifter rail for a reverse gear of said transmission.

3. The parking system according to claim 1, wherein said means for converting the movement of said parking shifter rail comprises a cam on said parking shifter rail.

4. The parking system according to claim 1, wherein said lock lever comprises a first arm engaged with a stop pin for locking the engagement of said parking pawl with said parking gear, and a second arm engageable with said fork means.

* * * * *